US009232610B2

United States Patent
Gritti (10) Patent No.: US 9,232,610 B2
(45) Date of Patent: Jan. 5, 2016

(54) CODED LIGHT DETECTOR (71) Applicant: KONINKLIJKE PHILIPS N.V., Eindhoven (NL)

(72) Inventor: Tommaso Gritti, Breda (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 0 days.

(21) Appl. No.: 14/351,153

(22) PCT Filed: Sep. 28, 2012

(86) PCT No.: PCT/IB2012/055174
§ 371 (c)(1),
(2) Date: Apr. 11, 2014

(87) PCT Pub. No.: WO2013/054221
PCT Pub. Date: Apr. 18, 2013

(65) Prior Publication Data
US 2014/0265878 A1 Sep. 18, 2014

Related U.S. Application Data (60) Provisional application No. 61/547,101, filed on Oct. 14, 2011.

(51) Int. Cl.
*H05B 37/02* (2006.01)
*H04B 10/116* (2013.01)

(52) U.S. Cl.
CPC .............. *H05B 37/02* (2013.01); *H04B 10/116* (2013.01); *H05B 37/0272* (2013.01)

(58) Field of Classification Search
CPC .......... H05B 37/0245; H05B 37/0272; H05B 33/0821
USPC .......................... 315/153, 152, 159, 294, 312
See application file for complete search history.

(56) References Cited

U.S. PATENT DOCUMENTS

| | | | |
|---|---|---|---|
| 2010/0295457 A1* | 11/2010 | Lu et al. | 315/159 |
| 2012/0105217 A1* | 5/2012 | Kao et al. | 340/13.3 |
| 2013/0141010 A1* | 6/2013 | Reed et al. | 315/294 |

FOREIGN PATENT DOCUMENTS

| | | |
|---|---|---|
| WO | 2009010926 A2 | 1/2009 |
| WO | 2010079400 A1 | 7/2010 |
| WO | 2010131212 A1 | 11/2010 |
| WO | 2011073881 A1 | 6/2011 |
| WO | 2011086501 A1 | 7/2011 |

* cited by examiner

*Primary Examiner* — Daniel D Chang
(74) *Attorney, Agent, or Firm* — Meenakshy Chakravorty (57) ABSTRACT

A coded lighting system comprises a set of light sources and a remote control unit or an arrangement. The set of light sources emits coded light. In order to do so each light source is associated with a unique identifier. The remote control unit or the arrangement comprises an image sensor which captures images comprising light emitted by at least one of the light sources in the set of light sources. By analyzing the captured images the remote control unit or the arrangement is able to associate light sources affecting a particular region and/or object. The remote control unit or the arrangement is thereby able to transmit a control signal comprising updated light settings to the set of light sources.

14 Claims, 6 Drawing Sheets

CODED LIGHT DETECTOR

FIELD OF THE INVENTION

The present invention relates to the field of coded light and in particular to a remote control unit and a method for controlling a set of light sources emitting coded light.

BACKGROUND OF THE INVENTION

The advent of integrated lighting installations, consisting of an ever growing number of individually controllable light sources, luminaires, lighting arrangements and the like with advanced rendering capabilities, may be regarded as transforming lighting systems for both professional and consumer markets. This brings a need for an intuitive control capable of fully exploiting the rendering capabilities of the complete lighting infrastructure. Several approaches have been proposed to control light sources, luminaires, lighting arrangements and the like.

A first example involves wall-mounted control. At commissioning time a set of wall-mounted controls are installed, each of them controlling an individual or group of light sources or luminaires, possibly with optimized controls for each type of control within the set.

A second example involves having a separate remote control unit for each individual light source or luminaire. This may be regarded, by means of the remote control unit, as a more or less straight forward extension of the above disclosed wall switch control.

A third example involves iterative selection of the individual light sources or luminaires. A user is provided with a simple remote control unit capable of controlling all light sources or luminaires which the remote control unit has been commissioned with. The remote control unit is able to control a single luminaire at a time, but it may also allow a user to browse through all the luminaires, for example by manipulation of a user interface provided on the remote control unit (e.g. by using "previous" or "next" buttons). A digital version of such a concept has also been developed, which adopts a touch screen device as a remote control unit, so that, once a light source or luminaire is selected, a light control optimized for such a light source or luminaire is displayed to the user (e.g. color temperature for a light source or luminaire with tunable white; or a color wheel for an RGB light) by means of the touch screen on the remote control unit.

A fourth example involves the concept of point and control; this approach exploits the principle of coded light and a remote control unit capable of detecting the code of the light source or luminaire toward which the remote control unit is pointed and thereby to identify the light source or luminaire emitting the coded light. Such a remote control unit typically comprises one or more photodiodes for detecting the coded light emitted by the light source or luminaire. In general, coded light has been proposed to enable advanced control of light sources. Coded light is based on embedding of data, inter alia invisible identifiers, in the light output of the light sources. Coded light may thus be defined as the embedding of data and identifiers in the light output of a visible light source, f.i. applying CDMA modulation techniques, wherein the embedded data and/or identifier preferably do not influence the primary lighting function of the light source. Hence, any modulation of the emitted light pertaining to data and/or identifier should be invisible to humans. This allows for applications such as interactive scene setting, commissioning and re-commissioning of networked lighting systems. Coded light may be used in communications applications wherein one or more light sources in a coded lighting system are configured to emit coded light and thereby communicate information to a receiver.

The point and control approach shows the advantage of using coded light as a means to be able to select a luminaire by simply pointing towards it. As noted above, this approach employs a photodiode in order to detect the Coded Light message of each luminaire. It has been proposed to detect and decode coded light by means of a standard camera.

International application WO 2009/010926 relates to a method for processing light in a structure where the light sources emit light carrying individual codes. A camera is arranged in a camera position of the structure and registers images of spots of the light. WO 2009/010926 is based on an insight that by using a camera for registering images of the light emitted from the light sources after installation thereof, and recognizing the individual codes in the registered images, it is possible to obtain a fast and at least substantially automatic determination of light source properties. The camera may comprise an image detector comprising a matrix of detector elements each generating one pixel of the registered image. The camera registers images of illuminated areas at a frequency that corresponds to, or is adapted to, the modulation frequency of CDMA modulation. Thereby it is possible for the camera to generate images that capture different CDMA codes of the different illuminated areas.

SUMMARY OF THE INVENTION

The inventors of the enclosed embodiments have identified a number of disadvantages with the above noted first, second, third and fourth examples. For example, it may be time consuming because the user needs to either browse through all light sources or luminaires (as in the third example), or point the remote control unit toward each individual light source or luminaire (as in the fourth example).

For example, the above disclosed arrangements of light sources or luminaires and remote control units are not scalable. With an increasing number of light sources and luminaires in the arrangement, browsing through each light (as in the third example), or carrying along an individual remote control unit for each light (as in the second example) can be a tedious and error prone process.

For example, the above disclosed arrangements of light sources or luminaires and remote control units are not flexible. A wall mount switch for every configuration would have to be modified or added once a new type of setting, or subset of light sources or luminaires would need to be defined (as in the first example).

It is an object of the present invention to overcome these problem, and to provide a remote control unit and a method for controlling a set of light sources emitting coded light that are less time consuming, scalable, and flexible without being complex or error prone.

According to a first aspect of the invention, this and other objects are achieved by a remote control unit for controlling a set of light sources, comprising an image sensor arranged to capture at least one image and to detect coded light in the at least one image; a processing unit arranged to determine a region and/or object in an image captured by the image sensor; associate, by virtue of the detected coded light, the determined region and/or object with a set of light sources emitting the detected coded light, each light source having one or more light settings, wherein the region and/or object in the image is illuminated at least by the set of light sources; receive an input signal relating to updated light settings of the set of light sources; and a transmitter arranged to transmit a control signal corresponding to the updated light settings to the set of light sources.

Such a remote control unit may advantageously shorten the time needed to determine settings for a set of light sources in a coded lighting system since it does not require a remote control to receive coded light exclusively from one of the light sources one by one. The disclosed remote control unit advantageously also scales with the number of light sources in the system since the functionality of the disclosed remote control unit is independent of the number of light sources in the system. Furthermore, the disclosed approach allows a user to focus on the desired light effects, regardless of the number and location of light sources. An example of this would imply a user interface which presents to the user settings for the overall light effect affecting the selected area/object, instead of a specific user interface for each individual light source influencing the area/object. This type of interface may be preferred for quick settings, while an interface allowing to individually set the parameters of each light source affecting the area would be preferred when accuracy and full control of the light settings is necessary.

The processing unit may be further arranged to receive at least two images from the image sensor and to detect a difference between the at least two images; and determine the region and/or object in one of the two images from the difference. The remote control unit may thus advantageously identify the object and/or region from captured images.

The processing unit may be further arranged to receive user input identifying an area in the image; and from the identified area determine an outline of the object and/or region so as to determine the object and/or region. The remote control unit may thus advantageously identify the object and/or region from user input.

The remote control unit may further comprise a user interface arranged to provide the processing unit with the user input upon user interaction with the user interface. The user interface may advantageously comprise a touch sensitive display which thus provides for easy identification of the region and/or object by the user of the remote control unit.

The image sensor may further be arranged to capture a plurality of images so as to form a stack of images from the plurality of images; determine the sum over all pixels per image in the stack of images to generate a conventional one-dimensional signal to determine which codes are present in a scene represented by the stack of images; and determine, from the stack of images, a footprint of the light source by correlating time dependence of all pixels with a code associated with the light source.

This may be possible either by using synchronization of the light sensor with the set of light sources, or by exploiting the rolling shutter characteristics of the image sensor. A light sensor embodied as a standard camera with a beam splitter and a photodiode may be able to maintain an overview of the environment, by means of the camera, and at the same time be able to detect codes at extremely high accuracy and speed, by means of the photodiode.

The processing unit may further be arranged to transmit identification of the region and/or object to the user interface. This may advantageously provide the user with feedback regarding the identified region and/or object.

The user interface may be arranged to provide a snapshot of the image comprising the object and/or region together with and indication of the object and/or region. This may advantageously further improve the feedback provided to the user.

The user interface may be arranged to provide an indication relating to which light source or light sources that affect illumination of the object and/or region. This may advantageously provide the user with feedback regarding the light sources.

The user interface may be arranged to provide light settings available for the set of light sources. This may advantageously provide the user of the remote control unit the possibility to change one or more light settings of the light source(s) affecting the identified region and/or object.

The processing unit may be further arranged to identify the region and/or object by segmenting image foreground information from image background information and to identify the region and/or object by virtue of the image foreground information. This may advantageously enable improved identification of the region and/or object.

The processing unit may be further arranged to identify the region and/or object by performing motion detection and/or estimation between the two images in order to detect an object and/or region that has moved between the two images. This may advantageously enable improved identification of the region and/or object.

The processing unit may be further arranged to identify the region and/or object by performing depth segmentation so as to obtain an image depth measurement from which the region and/or object is identified. This may advantageously enable improved identification of the region and/or object.

The processing unit may be further arranged to identify the region and/or object by performing object detection. This may advantageously enable improved identification of the region and/or object.

According to a second aspect of the invention, the objective is achieved by an arrangement comprising a remote control unit according to the above and at least one luminaire controllable by the remote control unit and comprising at least one light source from the set of light sources.

According to a third aspect of the invention, the objective is achieved by method for controlling a set of light sources, comprising capturing, by an image sensor, at least one image and detecting coded light in the at least one image; determining, by a processing unit, a region and/or object in an image captured by the image sensor; associating, by the processing unit, by virtue of the detected coded light, the determined region and/or object with a set of light sources emitting the detected coded light, each light source having one or more light settings, wherein the region and/or object in the image is illuminated at least by the set of light sources; receiving, by the processing unit, an input signal relating to updated light settings of the set of light sources; and transmitting, by a transmitter, a control signal corresponding to the updated light settings to the set of light sources.

It is noted that the invention relates to all possible combinations of features recited in the claims. Likewise, the advantages of the first aspect apply to the second aspect as well as the third aspect, and vice versa.

BRIEF DESCRIPTION OF THE DRAWINGS

The above and other aspects of the present invention will now be described in more detail, with reference to the appended drawings showing embodiment(s) of the invention.

DETAILED DESCRIPTION

The below embodiments are provided by way of example so that this disclosure will be thorough and complete, and will fully convey the scope of the invention to those skilled in the art. Like numbers refer to like elements throughout.

Recent development, such as exemplified by International application WO 2009/010926, has shown the possibility to detect coded light with the use of standard cameras Hereinafter a system which exploits a similar principle, combined with computer vision algorithms to automatically detect which luminaires are mostly influencing an object which is inserted, or recently moved, in the scene will be described.

Figure 1A:
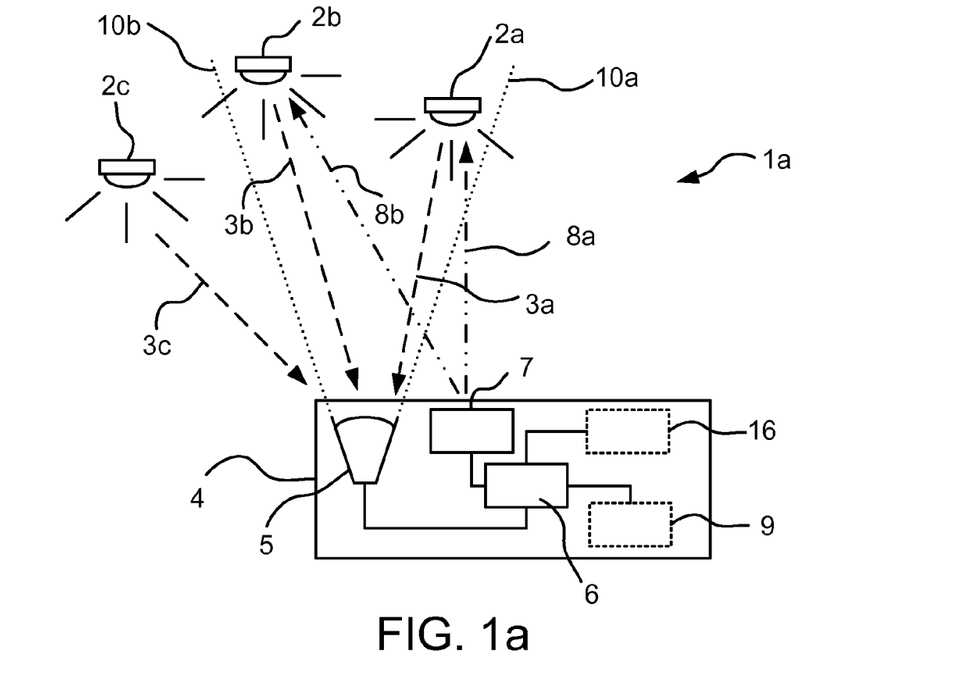
FIGS. 1a and 1b illustrate lighting systems according to embodiments.
Figure 1B:
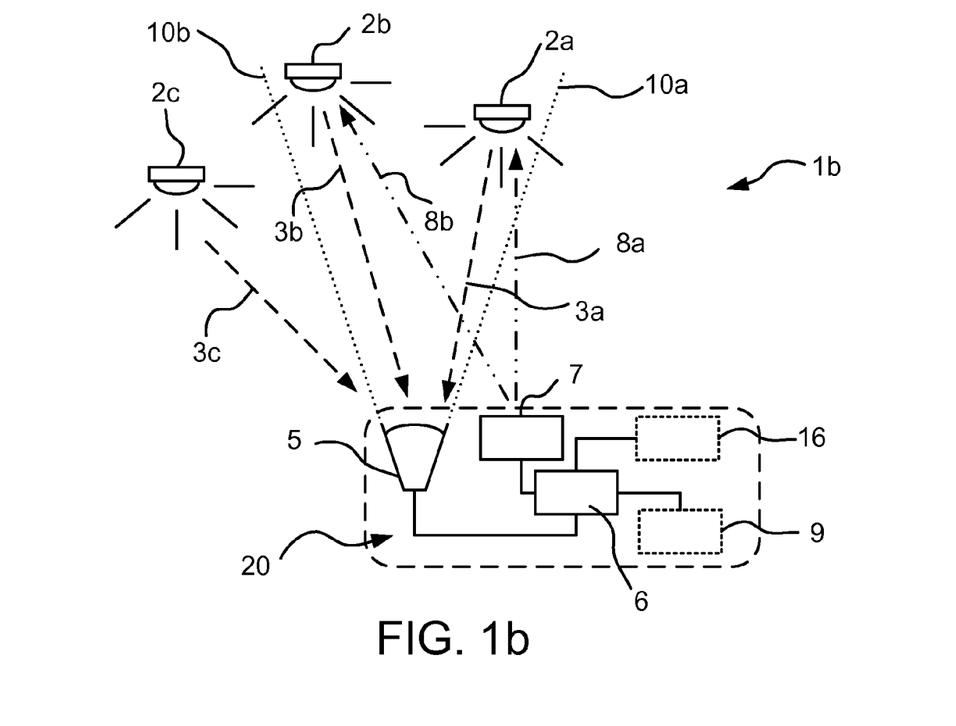
Figure 6A:
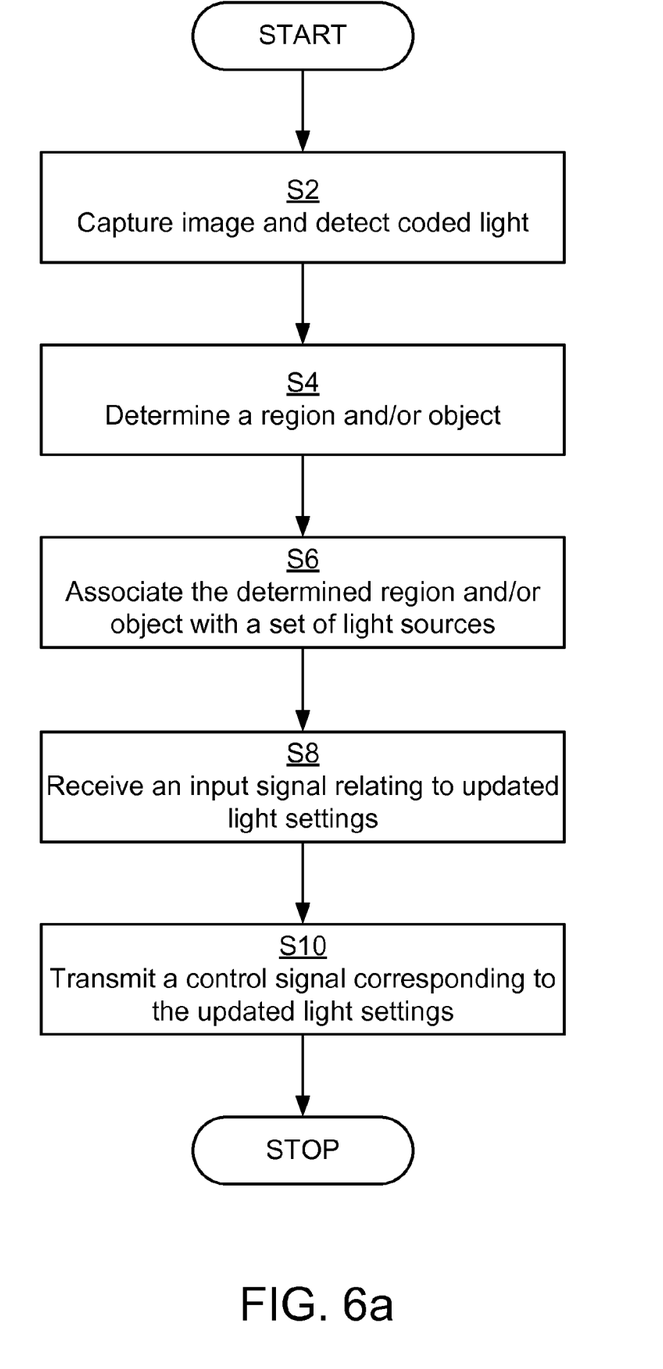
FIGS. 6a and 6b are flowcharts according to embodiments.
Figure 6B:
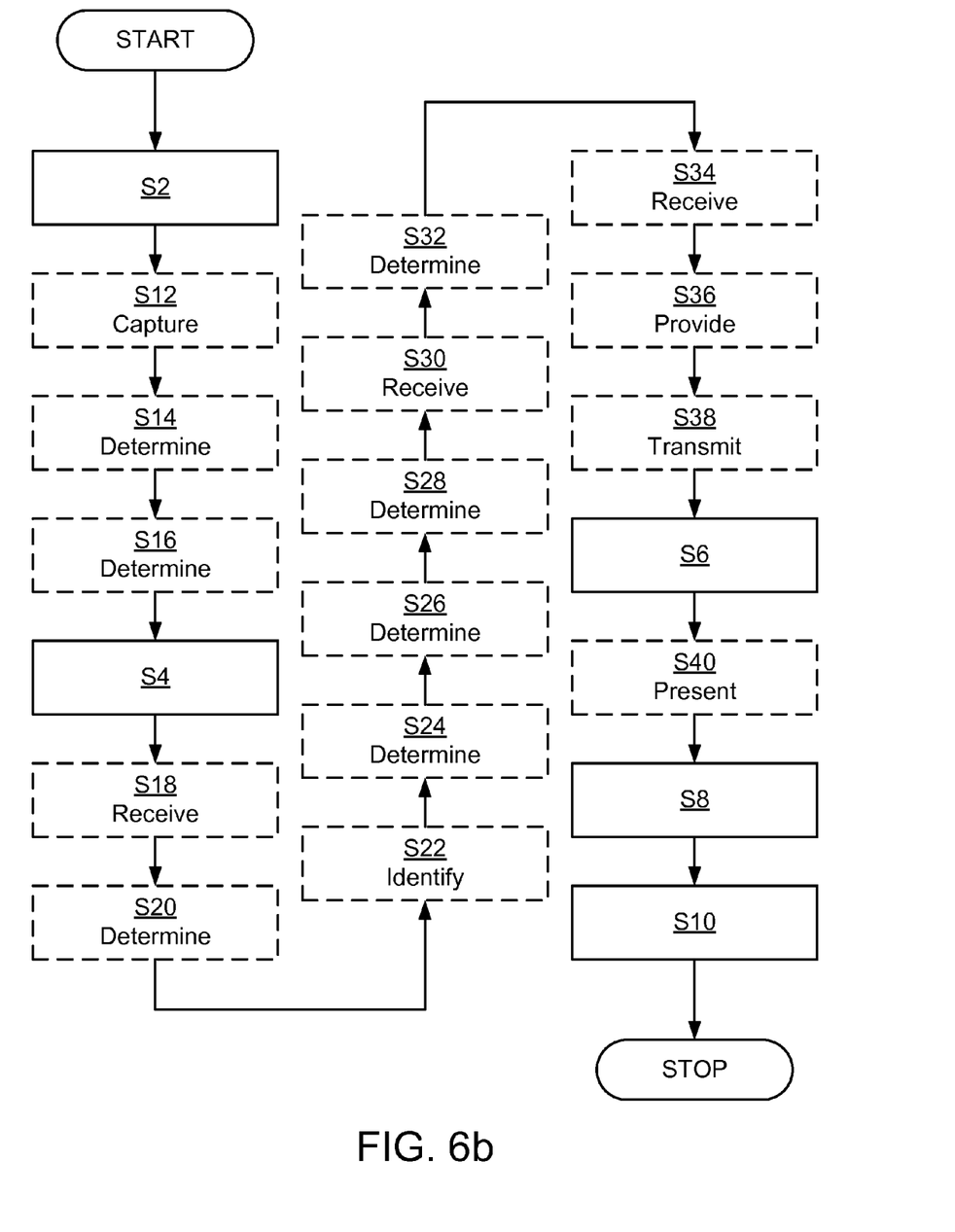

Operation of a lighting system will now be disclosed with reference to the lighting systems 1a of FIG. 1a and 1b of FIG. 1b, and the flowcharts of FIGS. 6a and 6b. The lighting systems 1a and 1b of FIGS. 1a and 1b comprise at least one light source arranged to emit coded light, schematically denoted by light sources with reference numerals 2a, 2b, 2c. The at least one light source 2a-c may be a luminaire and/or be part of a lighting control system. The lighting systems 1a and 1b may thus be denoted as coded lighting systems. A luminaire may comprise at least one light source 2a-c. The term "light source" means a device that is used for providing light in a room, for purpose of illuminating objects in the room. A room is in this context typically an apartment room or an office room, a gym hall, an indoor retail, environment, a theatre scene, a room in a public place or a part of an outdoor environment, such as a part of a street. Each light source 2a-c is capable of emitting coded light, as schematically illustrated by arrows 3a, 3b, 3c. The emitted light thus comprises a modulated part associated with coded light comprising information sequences. The emitted light may also comprise an un-modulated part associated with an illumination contribution. Each light source 2a-c may be associated with a number of light (or lighting) settings, inter alia pertaining to the illumination contribution of the light source, such as color, color temperature, intensity and frequency of the emitted light. In general terms the illumination contribution of the light source may be defined as a time-averaged output of the light emitted by the light source 2a-c.

The system 1a further comprises a device termed a remote control unit 4 arranged to receive and detect the coded light emitted by the light sources in the system 1a. The remote control unit 4 therefore comprises an image sensor 5 for detecting the light emitted by the light source(s) in the system 1a by capturing images comprising coded light. The remote control unit 4 further comprises a processing unit 6 operatively coupled to the image sensor 5. The processing unit 6 analyzes images captured by the image sensor 5 and identifies changes in the scene defined by the captured images, and particularly objects which have been moved or inserted in the scene. The remote control unit 4 further comprises a transmitter 7 operatively coupled to the processing unit. The transmitter 7 is arranged to transmit data, as schematically illustrated by arrows 8a, 8b to one or more of the light sources in the system 1a. The remote control unit 4 may further comprise other components, such as a memory 9 operatively coupled to the processing unit 6 and a user interface 16 also operatively coupled to the processing unit 6. The remote control unit 4 may be part of a mobile phone and the herein disclosed functionality may be provided as one or more applications, so-called "Apps". The one or more applications may be stored as one or more software products stored on a computer-readable storage medium.

In the alternative embodiment of FIG. 1b, the system 1b comprises an arrangement 20. The arrangement 20 comprises a number of physically separated (but operatively connectible) devices which when operationally connected (or coupled) enable the arrangement 20 arranged to receive and detect the coded light emitted by the light sources in the system 1b. The arrangement 20 therefore comprises an image sensor 5 for detecting the light emitted by the light source(s) in the system 1b by capturing images comprising coded light. The arrangement 20 further comprises a processing unit 6 operatively coupled to the image sensor 5. The processing unit 6 analyzes images captured by the image sensor 5 and identifies changes in the scene defined by the captured images, and particularly objects which have been moved or inserted in the scene. The arrangement 20 further comprises a transmitter 7 operatively coupled to the processing unit 6. The transmitter 7 is arranged to transmit data, as schematically illustrated by arrows 8a, 8b to one or more of the light sources in the system 1b. The arrangement 20 may further comprise other components, such as a memory 9 operatively coupled to the processing unit 6 and a user interface 16 also operatively coupled to the processing unit 6. The arrangement 20 may be advantageous in scenarios in which the image sensor 5 is either mounted fixed at the ceiling of the space to be illuminated by the light source 2a-c, or positioned at a certain location while an operator of the lighting system 1b is free to move around and change light settings while being in the scene himself/herself. The change of lighting settings will be further explained below. As an example, arranging the image sensor 5 fixed at the location enables the operator to move around freely in the area to be illuminated whilst interacting with the user interface 16 (which thus may be provided in a device which is physically different from the device holding the image sensor 5), whereby images of the scene to be illuminated could be wirelessly transmitted from the device holding the image sensor 5 to the device holding the user interface 16. This may also relieve the operator from having to point at the scene to be illuminated while changing the light settings. The processing unit 6 may be provided either in the device holding the image sensor 5, in the device holding the user interface 16, or in a third device.

Thus, whereas the remote control unit 4 of FIG. 1a represents an embodiment according to which the particularly the image sensor 5, the processing unit 6, and the transmitter 7 are part of one and the same physical device (i.e. the remote control unit 4), the arrangement 20 of FIG. 1b represents an embodiment according to which the image sensor 5, the processing unit 6, and the transmitter 7 are not necessarily part of one and the same device, but instead provided as two or more physically separated, but operatively coupled, devices.

Figure 2:
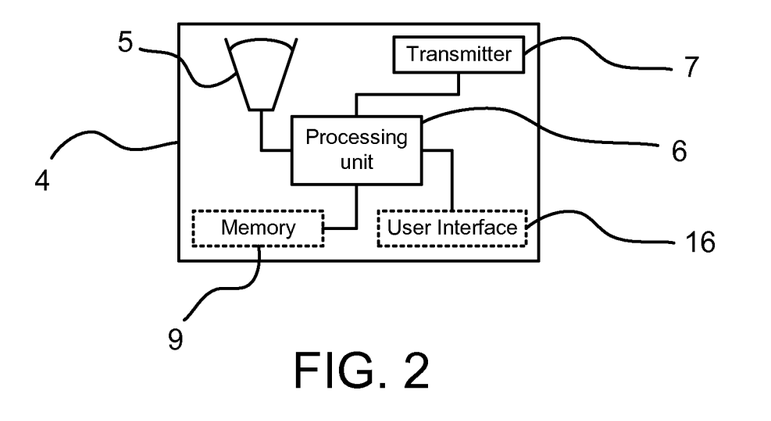
FIG. 2 illustrates a remote control unit.

FIG. 2 schematically illustrates, in terms of a number of functional blocks, the remote control unit 4, the components of which may also be part of the arrangement 20. The remote control unit 4 (and hence also the arrangement 20) comprises an image sensor 5 for receiving coded light from at least one light source, such as the light sources 2a-c in the lighting systems 1a, 1b. In a step S2 the image sensor 5 captures at least one image. The image sensor 5 then detects coded light in the at least one image. How coded light is detected in the at least one image will be further disclosed below. The image sensor 5 is further arranged to capture images within a field of view 10a-10b along a general light detection direction. The image sensor 5 is thus able to receive and detect light, particularly coded light, within the field of view 10-10b. The general light detection direction can be changed by changing the direction of the image sensor 5. The field of view 10a-10b may be narrowed by the remote control unit 4 performing a zoom-in operation. Similarly, the field of view 10a-10b may be broadened by the remote control unit 4 performing a zoomout operation. Thereby the image sensor 5 is enabled to capture images in a plurality of different directions and with a plurality of different fields of view. The remote control unit 4 (and hence also the arrangement 20) may thereby be arranged to identify an individual lighting device 2a-2c from the group of said at least one light source 2a-2c. For example the image sensor 5 may be able to detect the physical direction from which the detected light is emanating. These physical directions are in FIGS. 1a and 1b schematically denoted by arrows 3a-3c, which indicate the light emanating from the light source 2a-2c. As a second example the individual light source 2a-2c may be identified by said lighting device identification codes, which, as discussed above, may be embedded in the emitted light contributions of the light source 2a-2c.

Since each individual light source 2a-2c is associated with a unique lighting device identification code each individual light source 2a-2c may be identified. In order to do so the image sensor 5 may in a step S12 first capture a plurality of images so as to form a stack of images from the plurality of images (down sample if no higher resolution is needed). The image sensor 5 may in a step S14 determine the sum over all pixels per image in the stack of images to generate a conventional one-dimensional signal (in time) to determine which codes (and with which phase/time delay) that are present in the scene represented by the stack of images. The image sensor 5 may then in a step S16 use the stack of images to determine footprints of every light source 2a-2c by correlating the time dependence of all pixels with the corresponding code (and phase, from the previous step).

The remote control unit 4 (and hence also the arrangement 20) further comprises a processing unit 6. The processing unit 6 may be implemented by a so-called central processing unit (CPU). In the typical scenarios of FIGS. 1a and 1b, the image sensor 5 of the remote control unit 4 (or the arrangement 20) detects the light emitted by the one or more light sources 2a-2c (the light being within the field of view 10a-10b of the image sensor 5). The light comprises coded light defining a unique lighting device identification code. For example such an identification code may be realized as a pulse width modulation code. As a second example the identification code may be realized by using code division multiple access techniques. It is to be understood that other embodiments for the realization of identification codes are known to a person skilled in the art.

As will be further elaborated upon below the remote control unit 4 (and hence also the arrangement 20) may further comprise a user interface 16 through which a user is enabled to interact with the functionality of the remote control unit. Thus the user interface 16 may in particular be arranged to receive user input and to provide information to the user.

FIGS. 3a, 3b, 3c and 4 illustrate possible embodiments of controlling a set of light sources emitting coded light using the disclosed remote control unit 4 (or the arrangement 20). FIGS. 3a, 3b, 3c and 4 commonly depict an environment with several coded light sources 2a, 2b, 2c, 2d as captured by an image sensor 5 of the remote control 4 (or the arrangement 20). Once a new object 13 is placed in the scene, the image sensor 5 is used to detect the presence and location of the object 13. The region and/or object in the image is thus illuminated at least by the set of light sources 2a-b emitting the coded light. The region and/or object in the image may also be illuminated by additional light sources. Exploiting the principles described above for identifying individual light sources, the image sensor 5 is able to detect (and thereafter select) the coded light sources which are mostly affecting the new object. In the example of FIGS. 3a, 3b, 3c and 4 the light sources affecting the object 13 are those with reference numerals 2a and 2b. Each one of the FIGS. 3a, 3b, 3c and 4 will now be described in more detail.

Figure 3A:
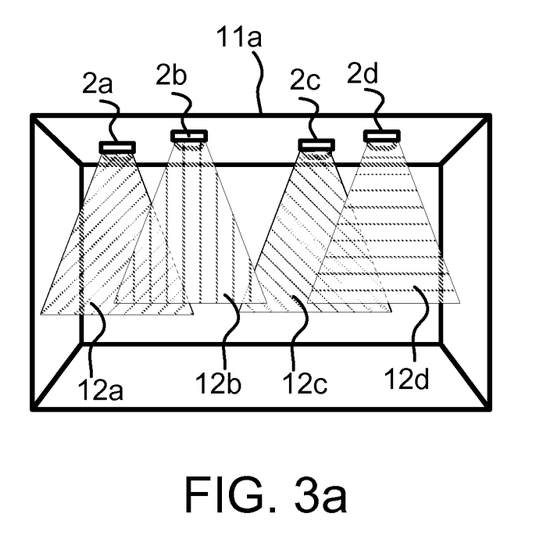
FIGS. 3a, 3b, 3c and 4 illustrate images as captured by an image sensor.

FIG. 3a illustrates a first image 11a as captured by the image sensor 5 of the remote control unit 4 (or the arrangement 20). The image 11a may be presented to a user interface of the remote control unit 4 (or the arrangement 20). The image 11a depicts a scene comprising light sources 2a-2c emitting coded light 12a-12d.

Figure 3B:
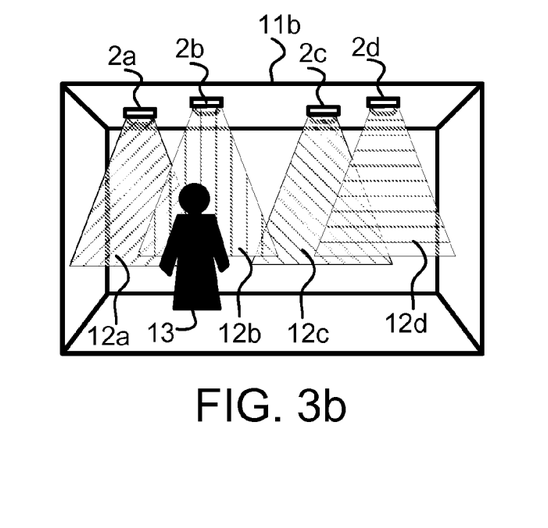

FIG. 3b illustrates a second image 11b as captured by the image sensor 5 of the remote control unit 4 (or the arrangement 20). In comparison to the first image 11a of FIG. 3a the second image 11b depicts the same scene as the image 11a with the difference that an object 13 has been added to the image 11b. The added object 13 may be detected by the processing unit 6. Particularly the processing unit 6 is arranged to, in a step S4, determine a region and/or object in an image captured by the image sensor 5. The processing unit 6 may utilize one of a number of ways to detect the added object 13.

According to an embodiment the processing unit 6 is further arranged to in a step S18 receive at least two images, such as the first image 11a and the second image 11b, from the image sensor 5 and to detect a difference between the at least two images 11a, 11b. In the exemplary scenario of the first image 11a and the second image 11b of FIGS. 3a and 3b respectively the difference is defined by the object 13 having been added in image 11b. The object 13 may thus be determined by the processing unit 6, in a step S20, in one of the two images 11a, 11b from the difference there between.

Background segmentation may be used alternatively or in combination therewith to determine the region and/or object 13 in one or more images captured by the image sensor 5. In background segmentation foreground segmentation mask is computed so as to separate the region and/or object from the background. Particularly, the processing unit 6 may further be arranged to in a step S22 identify the region and/or object 13 by segmenting image foreground information from image background information and to identify the region and/or object 13 by virtue of the image foreground information.

Motion detection/estimation may, in a step S24, be used alternatively or in combination therewith by the processing unit 6 to determine the region and/or object 13 in one or more images captured by the image sensor 5. In motion detection/estimation a map of all areas of the image which moved in the recent past is computed. The processing unit 6 may thus in particular be arranged to detect an object and/or region that has moved between the two images.

Depth segmentation may, in a step S26, be used alternatively or in combination therewith by the processing unit 6 to determine the region and/or object 13 in one or more images captured by the image sensor 5. In depth segmentation a map of what changed in the environment is obtained. Recent advances in 3D optical ranging have proven how to obtain a depth measurement for each pixel of a regular camera. The processing unit 6 may thus in particular be arranged to detect an object and/or region from an image depth measurement from which the region and/or object is identified.

Object detection may, in a step S28, be used alternatively or in combination therewith by the processing unit 6 to determine the region and/or object 13 in one or more images captured by the image sensor 5. In object detector the processing unit 6 could be trained to recognize only a specific category of objects, such as people, shoes, vegetables, etc., so that only if an object belonging to one of those categories appears in the scene a region would be made available.

The added object 13 may alternatively be detected from user interaction. In order to do so the remote control unit 4

(and hence also the arrangement 20) may comprise a user interface 16. The user interface 16 advantageously comprises a touch sensitive display. Touch sensitive displays and their functions are as such known in the art. The touch sensitive display may in particular be arranged to provide the processing unit 6 with the user input upon user interaction with the touch sensitive display. The user interface may also be gaze based or based on tactile interaction. If the user interface 16 is gaze based the remote control unit 4 (or the arrangement 20) advantageously comprises a camera unit arranged to be directed towards one eye (or both eyes) of the user of the control unit 4 (or the user interface 16 of the arrangement 20) and where the processing unit 6 uses eye-tracking so as to determine the point of gaze of the user to determine an object and/or region in the displayed image. The user input may receive tactile user input for example from a keyboard or a joystick provided on, or being operatively coupled to, the remote control unit 4 (or the arrangement 20). As the skilled person understands, there may be other equally likely and equivalent ways of receiving user input.

Figure 3C:
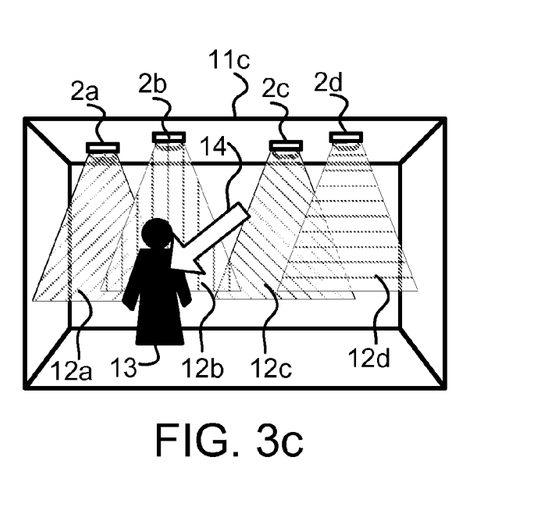

FIG. 3c illustrates a third image 11c as captured by the image sensor 5 of the remote control unit 4 (or the arrangement 20). In comparison to the second image 11b of FIG. 3b the second image 11c depicts the same scene as the image 11b with the difference that a marker 14 marking the object 13 has also been added to the image 11c. For example, a user of remote control unit 4 (or the arrangement 20) may be allowed to point to an object in one of the images captured by the image sensor 5. The processing unit may therefore further be arranged to, in a step S30, receive user input identifying an area in the image. The received user input may be acknowledged to the user by providing the marker 14. The complete object outline may then be automatically segmented exploiting computer vision techniques as disclosed above. Thus from the identified area an outline of the object and/or region may be determined by the processing unit in a step S32 so as to determine the object and/or region. From the selected image area, all the relevant codes, i.e. codes associated with light sources 2a, 2b at least partly illuminating the identified area and/or object 13, can then be selected.

Figure 4:
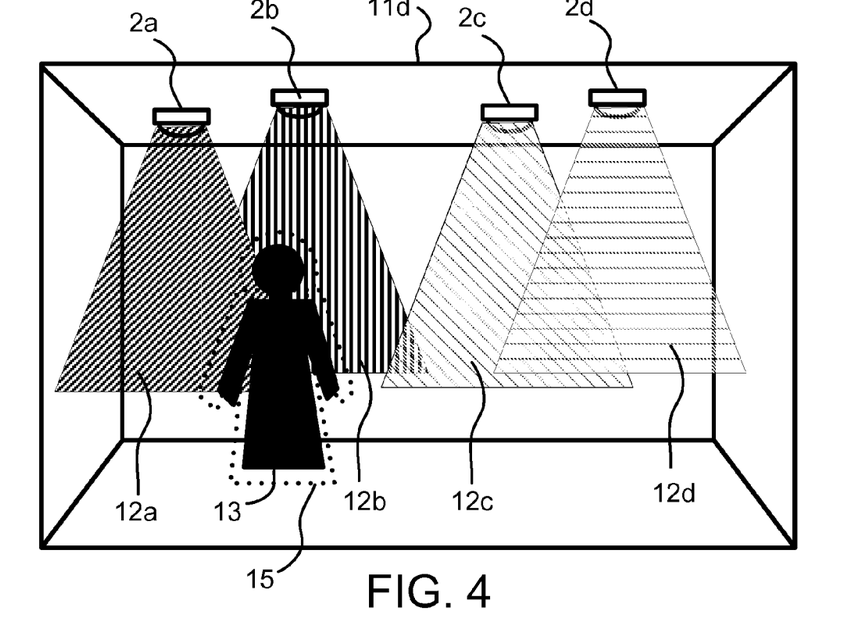

Once one or several relevant regions/objects have been detected, the user may, in a step S34, receive a snapshot of the image captured by the image sensor 5. Optionally the snapshot may be provided together with an indication, in a step S36, of which regions/objects that have been selected. The snapshot may be provided by the user interface 16. FIG. 4 illustrates such a snapshot image 11c as captured by the image sensor 5 of the remote control unit 4 (or the arrangement 20). The image 11c depicts the same scene as the images 11b and 11c. In addition the image 11c comprises and indication, in the form of a dotted line 15, of the detected object 13. Information pertaining to the indication is thus originally generated by the processing unit 6 in response to detecting the object 13 and may then be transmitted, in a step S38, from the processing unit 6 to the user interface 16 so as to provide the indication to the user. Alternatively, no image/indication is provided to the user. Instead, once a region/object has been detected, the light sources 2a, 2b affecting the region/object may provide visible indication, such as emitting one or more blinkings, so that the user can recognize which region/object that is currently selected. In such a case the remote control unit 4 (or the arrangement 20) upon detection of the region/object and identification of the light sources 2a, 2b affecting the region/object transmits a control signal to the light sources 2a, 2b to provide the visible indication.

Figure 5:
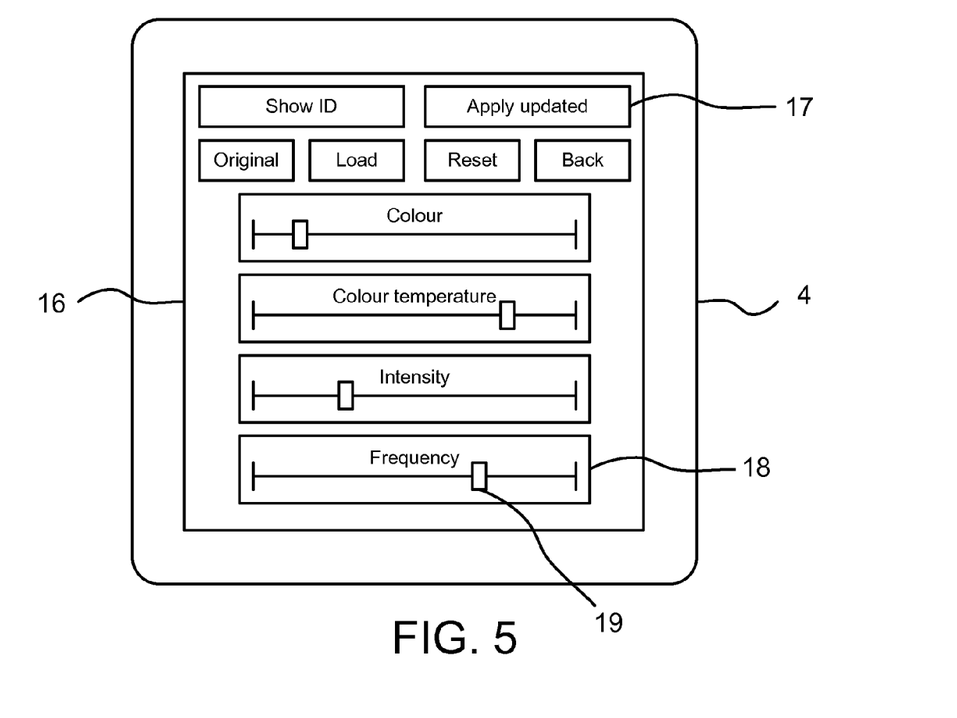
FIG. 5 illustrates an example of a user interface of a remote control unit or an arrangement.

By virtue of the detected coded light the processing unit 6 is further arranged to, in a step S6, associate the determined region and/or object with a set of light sources 2a-b emitting the coded light, where the coded light has been detected by the image sensor 5 in step S2. Once a region/object is detected, the user may additionally be presented with a user interface through which the user is enabled to change one or more applicable lighting settings or properties of the light sources 2a, 2b affecting the detected region/object, step S40. This is illustrated in FIG. 5. Particularly, the processing unit 6 is in a step S8 arranged to receive an input signal relating to updated light settings of the set of light sources 2a, 2b.

FIG. 5 shows an example of a user interface 16 of the remote control unit 4. With respect to the arrangement 20 the user interface 16 may be provided as a separate physical unit. Controllable properties of the light may pertain to color of the emitted light, the color temperature of the emitted light, the intensity of the emitted light and/or the blinking frequency of the emitted light. In the example of FIG. 5 this is illustrated by a number of available settings 18 with which a user may interact by setting values of respective slidebars 19. The user interface thereby enables controlling lights by the setting of the properties of the particular group of light affecting the detected region/object.

As noted above the remote control unit 4 (and hence also the arrangement 20) further comprises a transmitter 7. The transmitter 7 is arranged to, in a step S10 transmitting a control signal corresponding to the updated light settings to the set of light sources 2a, 2b. The set of light sources 2a, 2b is thereby controlled by the remote control unit 4.

The remote control unit 4 (and hence also the arrangement 20) may further comprise other components, such as a memory 9 operatively coupled to the processing unit 6. The memory 9 is operated according to principles which as such are known by the skilled person. Particularly, the memory 9 may comprise a set of lighting settings which may be transmitted to light sources 2a-2c in the lighting systems 1a, 1b. The transmitter 7 may be a light transmitter configured to emit coded light. Alternatively the transmitter 7 may be a radio transmitter configured to wirelessly transmit information. The transmitter 7 may be configured for bidirectional communications. The transmitter 7 may comprise a radio antenna. Alternatively the transmitter 7 may comprise a connector for wired communications.

The person skilled in the art realizes that the present invention by no means is limited to the preferred embodiments described above. On the contrary, many modifications and variations are possible within the scope of the appended claims. Particularly, the disclosed remote control unit 4 and at least one luminaire comprising at least one light source 2a, 2b, 2c and being controllable by the remote control unit 4 may be provided as an arrangement.

In summary, the disclosed embodiments are applicable to several scenarios: in retail lighting, it allows shopping personnel to easily select luminaires affecting a new product inserted in a shopping window; for a light designer, it allows to move in the environment to a certain location, and automatically be able to choose lights which affect such position, without any need of a pointing device.

The invention claimed is:

1. A remote control unit for controlling a set of light sources, comprising:
   an image sensor arranged to capture at least one image and to detect coded light in said at least one image;
   a processing unit arranged to:
   determine a region and/or object in an image captured by the image sensor;
   use said detected coded light to identify a set of light sources emitting said detected coded light that are illuminating said region and/or object, each light source having one or more light settings; and receive an input signal relating to updated light settings of said set of light sources;

a user interface configured to receive identification of said region and/or object from the processing unit; and a transmitter arranged to transmit a control signal corresponding to said updated light settings to said set of light sources.

2. The remote control unit according to claim 1, wherein the processing unit is further configured to:

receive at least two images from the image sensor and to detect a difference between the at least two images; and determine the region and/or object in one of the two images from said difference.

3. The remote control unit according to claim 2, wherein the processing unit is further arranged to identify the region and/or object by performing motion detection and/or estimation between the two images in order to detect an object and/or region that has moved between the two images.

4. The remote controller according to claim 1, wherein the processing unit is further configured to:

receive user input identifying an area in the image; and from the identified area determine an outline of the object and/or region so as to determine the object and/or region.

5. The remote control unit according to claim 4, wherein the user interface is arranged to provide the processing unit with the user input upon user interaction with the user interface.

6. The remote control unit according to claim 1, wherein the image sensor is further configured to:

capture a plurality of images so as to form a stack of images from said plurality of images;

determine the sum over all pixels per image in said stack of images to generate a conventional one-dimensional signal to determine which codes that are present in a scene are represented by the stack of images; and determine, from the stack of images, a footprint of the light source by correlating time dependence of all pixels with a code associated with the light source.

7. The remote control unit according to claim 1, wherein the user interface is arranged to provide a snapshot of the image comprising the object and/or region together with an indication of the object and/or region.

8. The remote control unit according to claim 1, wherein the user interface is arranged to provide an indication relating to which light source or light sources that affect illumination of the object and/or region.

9. The remote control unit according to claim 8, wherein the user interface is arranged to provide light settings available for said set of light sources.

10. The remote control unit according to claim 1, wherein the processing unit is further arranged to identify the region and/or object by segmenting image foreground information from image background information and to identify the region and/or object by virtue of the image foreground information.

11. The remote control unit according to claim 1, wherein the processing unit is further arranged to identify the region and/or object by performing depth segmentation so as to obtain an image depth measurement from which the region and/or object is identified.

12. The remote control unit according to claim 1, wherein the processing unit is further arranged to identify the region and/or object by performing object detection.

13. An arrangement comprising a remote control unit according to claim 12 and at least one luminaire controllable by the remote control unit and comprising at least one light source from said set of light sources.

14. A method for controlling a set of light sources, comprising:

capturing, by an image sensor, at least one image and detecting coded light in said at least one image;

determining, by a processing unit, a region and/or object in an image captured by the image sensor;

the processing unit, identifying, using said detected coded light, a set of light sources emitting said detected coded light that are illuminating the determined region and/or object, each light source having one or more light settings;

receiving, by a user interface, identification of said region and/or object from the processing unit;

receiving, by the processing unit, an input signal relating to updated light settings of said set of light sources, wherein the input signal sets an overall light effect affecting the determined region and/or object; and transmitting, by a transmitter, a control signal corresponding to said updated light settings to said set of light sources.

* * * * *